United States Patent [19]

Kawabata et al.

[11] Patent Number: 5,456,726
[45] Date of Patent: Oct. 10, 1995

[54] REACTIVE DYE COMPOSITION AND METHOD FOR DYEING OR PRINTING CELLULOSE FIBER MATERIAL USING THE SAME

[75] Inventors: Shigeru Kawabata; Naoki Harada, both of Ibaraki; Shuhei Hashizume, Osaka, all of Japan

[73] Assignee: Sumitomo Chemical Company, Limited, Osaka, Japan

[21] Appl. No.: 230,003

[22] Filed: Apr. 19, 1994

Related U.S. Application Data

[63] Continuation-in-part of Ser. No. 166,820, Dec. 15, 1993, abandoned.

[30] Foreign Application Priority Data

Dec. 22, 1992 [JP] Japan ................................ 4-356630

[51] Int. Cl.⁶ ...................... C09B 67/22; C09B 62/503; D06P 1/38
[52] U.S. Cl. ........................ 8/549; 8/643; 8/638; 8/676; 8/680
[58] Field of Search .................... 8/543, 549, 643, 8/638, 676, 680

[56] References Cited

U.S. PATENT DOCUMENTS

| | | | |
|---|---|---|---|
| 4,705,524 | 11/1987 | Hähnke et al. | 8/527 |
| 5,045,084 | 9/1991 | Walter | 8/641 |
| 5,232,462 | 8/1993 | Tzikas | 8/549 |

FOREIGN PATENT DOCUMENTS

| | | | |
|---|---|---|---|
| 0224224 | 6/1987 | European Pat. Off. . | |
| 0300195 | 1/1989 | European Pat. Off. . | |
| 325246 | 7/1989 | European Pat. Off. | C09B 62/503 |
| 0539836 | 5/1993 | European Pat. Off. . | |
| 60-108472 | 6/1985 | Japan | C09B 62/50 |
| 4028769 | 1/1992 | Japan | C09B 62/04 |
| 2198447 | 6/1988 | United Kingdom . | |

*Primary Examiner*—Paul Lieberman
*Assistant Examiner*—Margaret Einsmann
*Attorney, Agent, or Firm*—Stevens, Davis, Miller & Mosher

[57] ABSTRACT

A reactive dye composition containing at least one dioxazine compound of the formula (I) in the free acid form:

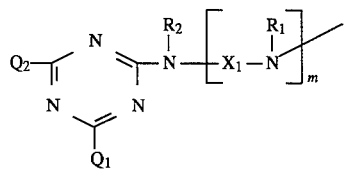

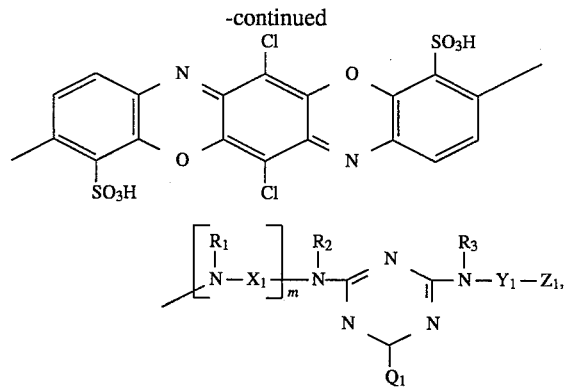

wherein $R_1$, $R_2$, $R_3$, $Z_1$, m, $Y_1$, $Z_1$, $Q_1$ and $Q_2$ are as defined in the claims, or at least one dioxazine compound of the formula (II) in the free acid form:

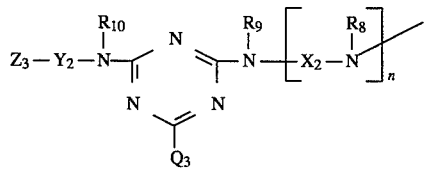

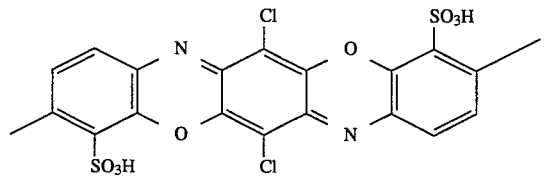

wherein $R_8$, $R_9$, $R_{10}$, $X_2$, n, $Y_2$, $Z_2$, $Z_3$ and $Q_3$ are as defined in the claims, or a mixture of at least one dioxazine compound of the formula (I) and at least one dioxazine compound of the formula (II); and at least one anthraquinone compound of the formula (III) in the free acid form:

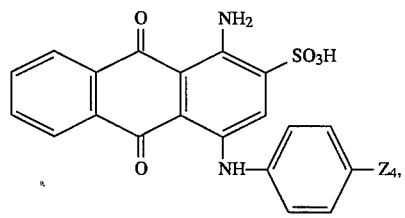

wherein $Z_4$ is as defined in the claims; can dye a cellulose fiber material or a fiber material containing cellulose fiber uniformly blue, with a small amount of salt, with a good build-up property, in a high reproducibility.

6 Claims, No Drawings

REACTIVE DYE COMPOSITION AND METHOD FOR DYEING OR PRINTING CELLULOSE FIBER MATERIAL USING THE SAME

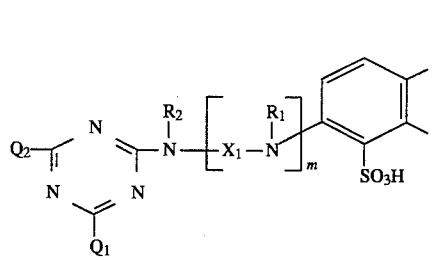
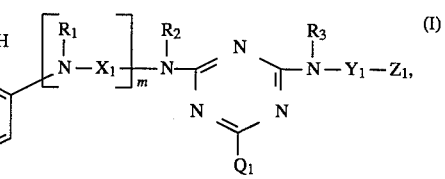

This application is a continuation-in-part of application Ser. No. 08/166,820, filed Dec. 15, 1993, now abandoned.

The present invention relates to a reactive dye composition and a method for dyeing or printing cellulose fiber materials using the same.

As a water-soluble reactive dye for dyeing cellulose fiber materials or cellulose fiber-containing fiber materials, a variety of compounds are known. As a reactive dye used for dyeing the fiber materials in blue color, azo, formazan, phthalocyanine and anthraquinone dyes are well known. Dioxazine type reactive dyes have also been developed recently.

However, these blue dyes are all disadvantageous in some respect. Generally speaking, phthalocyanine dyes are inferior in color yield and build-up property. Azo and formazan dyes cannot produce a vivid hue. Anthraquinone

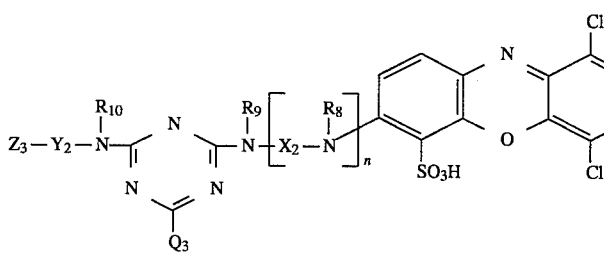

dyes cannot show a high color yield when used for dyeing the fiber materials by an exhaustion dyeing method using a small amount of salt, and the color yield varies with change of dyeing temperatures. Dioxazine dyes are used with inevitable disadvantages such that color yield varies greatly with change of the amount of salt used in the exhaustion dyeing.

In view of the above-mentioned state of the art, the present inventors conducted elaborate studies with the aim of obtaining a dye capable of always giving a high color yield even if small amounts of salt are used in the exhaustion dyeing, excellent in dyeing reproducibility and excellent in various dye characteristics. As a result, it was found that a reactive dye composition comprising a specific dioxazine compound and a specific anthraquinone compound can achieve the object without deteriorating the excellent dye characteristics of the dioxazine and anthraquinone compounds such as, for example, high vividness and build-up property.

Thus, the present invention provides a reactive dye composition comprising:

A) at least one member selected from the dioxazine compound group represented by the following formula (I) in the free acid form:

wherein $R_1$, $R_2$ and $R_3$ are independently hydrogen or unsubstituted or substituted lower alkyl, $X_1$ is an unsubstituted or substituted and straight, branched or cyclic aliphatic bridging group or an unsubstituted or substituted aromatic bridging group, m is 0 or 1, $Y_1$ is unsubstituted or substituted phenylene or unsubstituted or substituted naphthylene, $Z_1$ is —$SO_2CH=CH_2$ or —$SO_2CH_2CH_2L_1$ in which $L_1$ is a group capable of being split by the action of an alkali, $Q_1$ is halogeno, unsubstituted or substituted pyridinio, —$N(R_4)R_5$, —$OR_6$ or —$SR_7$ in which $R_4$, $R_5$, $R_6$ and $R_7$ are independently hydrogen or an unsubstituted or substituted alkyl, phenyl, naphthyl or benzyl group, and $Q_2$ is chloro or fluoro; or at least one member selected from the dioxazine compound group represented by the following formula (II) in the free acid form:

wherein $R_8$, $R_9$ and $R_{10}$ are independently hydrogen or unsubstituted or substituted lower alkyl, $X_2$ is an unsubstituted or substituted and straight, branched or cyclic aliphatic bridging group or an unsubstituted or substituted aromatic bridging group, n is 0 or 1, $Y_2$ is unsubstituted or substituted phenylene or unsubstituted or substituted naphthylene, $Z_2$ and $Z_3$ are independently —$SO_2CH=CH_2$ or —$SO_2CH_2CH_2L_2$ in which $L_2$ is a group capable of being split by the action of an alkali, and $Q_3$ is halogeno, unsubstituted or substituted pyridinio, —$N(R_{11})R_{12}$, —$OR_{13}$ or —$SR_{14}$ in which $R_{11}$, $R_{12}$, $R_{13}$ and $R_{14}$ are independently hydrogen or an unsubstituted or substituted alkyl, phenyl, naphthyl or benzyl group; or a mixture of the dioxazine compound of the formula (I) and the dioxazine compound of the formula (II); and B) at least one member selected from the anthraquinone compound group represented by the following formula (III) in the free acid form:

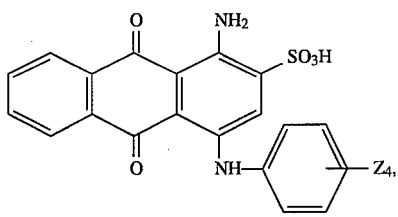

wherein $Z_4$ is $-SO_2CH=CH_2$ or $-SO_2CH_2CH_2L_3$ in which $L_3$ is a group capable of being split by the action of an alkali.

The present invention also provides a method for dyeing or printing a cellulose fiber material or a fiber material containing cellulose fiber by the use of said reactive dye composition.

The aliphatic bridging group represented by $X_1$ and $X_2$ in the formulas (I) and (II), respectively, may contain a hetero atom, and may be unsubstituted or substituted by sulfo, carboxy, methyl, methoxy, unsubstituted or substituted phenyl or the like. In the case both $X_1$ and $X_2$ are the aliphatic bridging groups, they may be the same or different. Examples of the preferable group are as follows:

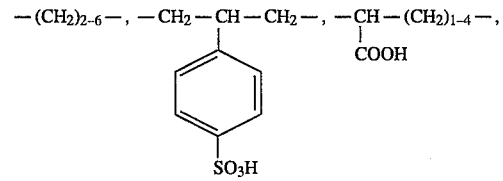

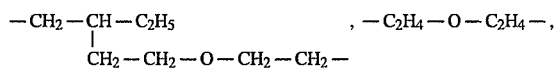

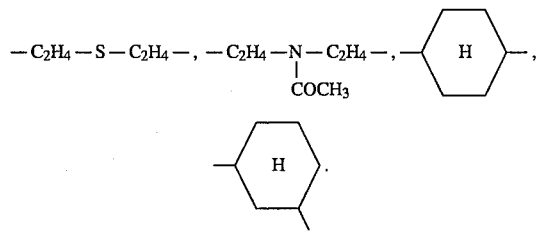

The aromatic bridging group represented by $X_1$ and $X_2$, may contain a hetero atom, and may be unsubstituted or substituted by sulfo, carboxy, methyl, methoxy, unsubstituted or substituted phenyl or the like. Examples of the preferable group are as follows:

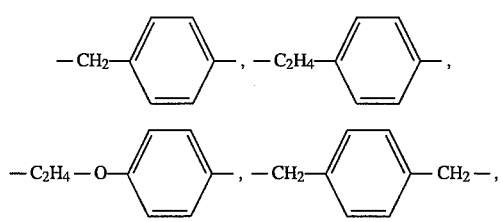

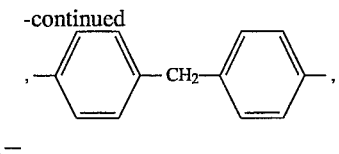

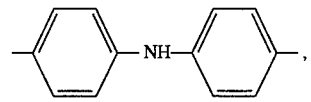

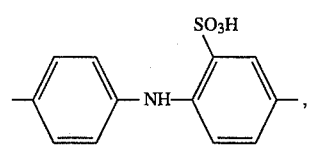

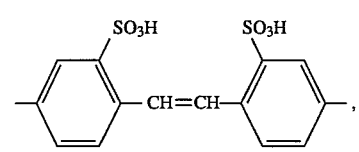

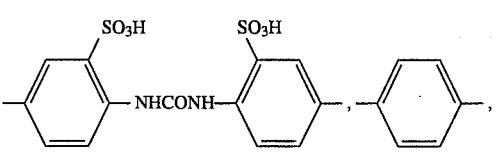

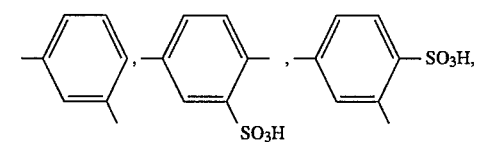

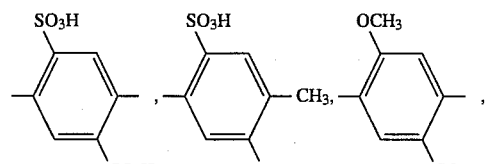

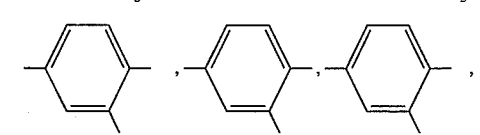

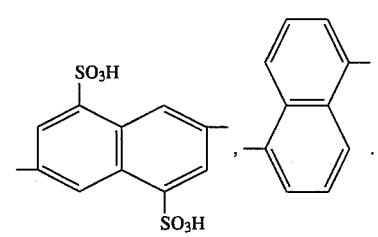

Of the examples enumerated above, it is particularly preferable that $X_1$ and $X_2$ are independently selected from ethylene, propylene, phenylene and phenylene having one or two sulfo groups.

When an alkyl group is selected as any of $R_4$ to $R_7$ and $R_{11}$ to $R_{14}$, the group is preferably an alkyl group having 1 to 4 carbon atoms which may be unsubstituted or substituted by one or two substituents selected from the group consisting of alkoxy, sulfo, carboxy, hydroxy, chloro, phenyl and sulfato. Particularly preferred are methyl, ethyl, n-propyl, isopropyl, n-butyl, isobutyl, sec-butyl, β-hydroxyethyl, β-sulfatoethyl, β-sulfoethyl, β-methoxyethyl, β-carboxyethyl, and the like. In the case where two or more of $R_4$ to $R_7$ and $R_{11}$ to $R_{14}$ are alkyl groups, they are the same or different.

When unsubstituted or substituted phenyl is selected as any of $R_4$ to $R_7$ and $R_{11}$ to $R_{14}$, the group is preferably phenyl or phenyl substituted by one or two substituents selected from the group consisting of $C_1$–$C_4$ alkyl, $C_1$–$C_4$ alkoxy, sulfo, carboxy, chloro and bromo. Particularly preferred are 2-, 3- or 4-sulfophenyl, 2,4- or 2,5-disulfophenyl, 2-, 3- or 4-carboxyphenyl, phenyl and the like. In the case where two or more of $R_4$ to $R_7$ and $R_{11}$ to $R_{14}$ are unsubstituted or substituted phenyl groups, they are the same or different.

When unsubstituted or substituted naphthyl is selected as any of $R_4$ to $R_7$ and $R_{11}$ to $R_{14}$, the group is preferably naphthyl or naphthyl substituted by one, two or three substituents selected from the group consisting of hydroxy, carboxy, sulfo, $C_1$–$C_4$ alkyl, $C_1$–$C_4$ alkoxy and chloro. Particularly preferred are 2-, 3-, 4-, 5-, 6-, 7- and 8-sulfo-2-naphthyl, 1,5-, 5,7-, 6,8-, 4,8-, 4,7-, 3,8-, 4,6-, 3,7- and 3,6-disulfo-2-naphthyl, 4,6,8-, 2,4,7- and 3,6,8-trisulfo-1-naphthyl, 1,5,7-, 4,6,8- and 3,6,8-trisulfo-2-naphthyl, and the like. In the case where two or more of $R_4$ to $R_7$ and $R_{11}$ to $R_{14}$ are unsubstituted or substituted naphthyl groups, they are the same or different.

When unsubstituted or substituted benzyl is selected as any of $R_4$ to $R_7$ and $R_{11}$ to $R_{14}$, the group is preferably benzyl or benzyl substituted by one or two substituents selected from the group consisting of $C_1$–$C_4$ alkyl, $C_1$–$C_4$ alkoxy, sulfo and chloro. Particularly preferred are benzyl, 2-, 3- and 4-sulfobenzyl, and the like. In the case where two or more of $R_4$ to $R_7$ and $R_{11}$ to $R_{14}$ are unsubstituted or substituted benzyl, they are the same or different.

When halogeno is selected as $Q_1$ and/or $Q_3$, it is preferably chloro or fluoro. In the case both $Q_1$ and $Q_3$ are halogeno, they are the same or different. When unsubstituted or substituted pyridinio is selected as $Q_1$ and/or $Q_3$, it is preferably pyridinio or pyridinio substituted by carboxy or carbamoyl. In the case both $Q_1$ and $Q_3$ are unsubstituted or substituted pyridinio, they are the same or different.

When a group —$N(R_4)R_5$ or a group —$N(R_{11})R_{12}$ is selected as $Q_1$ and/or $Q_3$, it can be introduced in the molecule of the dioxazine compound by the use of a compound represented by the formula $HN(R_4)R_5$ or $HN(R_{11})R_{12}$. Specific examples of the compound represented by the formula $HN(R_4)R_5$ or $HN(R_{11})R_{12}$ are as follows:

ammonia;

aromatic amines such as 1-aminobenzene, 1-amino-2-, -3- or -4-methylbenzene, 1-amino-3,4- or -3,5-dimethylbenzene 1-amino-2-, -3- or -4-ethylbenzene, 1-amino-2-, -3- or -4-methoxybenzene, 1-amino-2-, -3- or -4-ethoxybenzene, 1-amino-2-, -3- or -4-chlorobenzene, 3- or 4-aminophenylmethanesulfonic acid, 2-aminobenzenesulfonic acid, 3-aminobenzenesulfonic acid, 4-aminobenzenesulfonic acid, 3-methylaminobenzenesulfonic acid, 3-ethylaminobenzenesulfonic acid, 4-methylaminobenzenesulfonic acid, 4-ethylaminobenzenesulfonic acid, 5-aminobenzene-1,3-disulfonic acid, 6-aminobenzene-1,4-disulfonic acid, 6-aminobenzene-1,3-disulfonic acid, 4-aminobenzene-1,2-disulfonic acid, 4-amino-5-methylbenzene-1,2-disulfonic acid, 2-, 3- or 4-aminobenzoic acid, 5-aminobenzene-1,3-dicarboxylic acid, 5-amino-2-hydroxybenzenesulfonic acid, 4-amino-2-hydroxybenzenesulfonic acid, 5-amino-2-ethoxybenzenesulfonic acid, N-methylaminobenzene, N-ethylaminobenzene, 1-methylamino-3- or -4-methylbenzene, 1-ethylamino-4-chlorobenzene, 1-ethylamino-3- or -4-methylbenzene, 1-(2-hydroxyethyl)amino-3-methylbenzene, 3- or 4-methylaminobenzoic acid, 3- or 4-methylaminobenzenesulfonic acid, 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene-1-sulfonic acid, 1-aminonaphthalene-2-sulfonic acid, 5-aminonaphthalene-2-sulfonic acid, 6-aminonaphthalene-2-sulfonic acid, 7-aminonaphthalene-2-sulfonic acid, 7-methylaminonaphthalene-2-sulfonic acid, 7-ethylaminonaphthalene-2-sulfonic acid, 7-butylaminonaphthalene-2-sulfonic acid, 7-isobutylaminonaphthalene-2-sulfonic acid, 8-aminonaphthalene-2-sulfonic acid, 4-aminonaphthalene-1,3-disulfonic acid, 5-aminonaphthalene-1,3-disulfonic acid, 6-aminonaphthalene-1,3-disulfonic acid, 7-aminonaphthalene-1,3-disulfonic acid, 8-aminonaphthalene-1,3-disulfonic acid, 2-aminonaphthalene-1,5-disulfonic acid, 3-aminonaphthalene-1,5-disulfonic acid, 4-aminonaphthalene-1,5-disulfonic acid, 4-aminonaphthalene-1,6-disulfonic acid, 8-aminonaphthalene-1,6-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-aminonaphthalene-2,7-disulfonic acid, 6-aminonaphthalene-1,3,5-trisulfonic acid, 7-aminonaphthalene-1,3,5-trisulfonic acid, 4-aminonaphthalene-1,3,6-trisulfonic acid, 7-aminonaphthalene-1,3,6-trisulfonic acid, 8-aminonaphthalene-1,3,6-trisulfonic acid and 4-aminonaphthalene-1,3,7-trisulfonic acid; and aliphatic amines such as methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, bis(2-hydroxyethyl)amine, 2-acetylaminoethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamic acid, aminoacetic acid, methylaminoacetic acid, ε-aminocaproic acid, benzylamine, 2-, 3- or 4-chlorobenzylamine, 4-methylbenzylamine, N-methylbenzylamine, 2-, 3- or 4-sulfobenzylamine, 2-phenylethylamine and 1-phenyl-2-propylamine.

When a group —$OR_6$ or group —$OR_{13}$ is selected as $Q_1$ and/or $Q_3$, it can be introduced in the molecule of the dioxazine compound by the use of a compound represented by $R_6OH$ or $R_{13}OH$, i.e. any of the compounds enumerated above of which amino group has been replaced by a hydroxy group. In the case both $Q_1$ and $Q_3$ represent a group —$OR_6$ or a group —$OR_{13}$, they are the same or different.

When a group —$SR_7$ or a group —$SR_{14}$ is selected as $Q_1$ and/or $Q_3$, it can be introduced in the molecule of the dioxazine compound by the use of a thiol compound represented by $R_7SH$ and $R_{14}SH$, i.e. any of the compounds enumerated above of which amino group has been replaced by a mercapto group. In the case both $Q_1$ and $Q_3$ represent a group —$SR_7$ or a group —$SR_{14}$, they are the same or different.

In the present invention, particularly preferable $Q_1$ and $Q_3$ are aniline, N-methylaniline, N-ethylaniline, 2-, 3- or 4-amino-benzenesulfonic acid, 3- or 4-ethylaminobenzenesulfonic acid, 6-aminobenzene-1,3- or -1,4-disulfonic acid, 2-, 3- or 4-aminobenzoic acid, taurine, N-methyltaurine, mono- or diethanolamine and the like. In the case both $Q_1$ and $Q_3$ represent —$N(R_4)R_5$ or —$N(R_{11})R_{12}$, they are the same or different.

$Y_1$ and $Y_2$ are preferably unsubstituted phenylene, phenylene substituted by one or two substituents selected from the group consisting of methyl, ethyl, methoxy, ethoxy, chloro, bromo and sulfo, unsubstituted naphthylene or naphthylene substituted once with sulfo. Some of the examples of preferable phenylene and naphthylene groups are as follows:

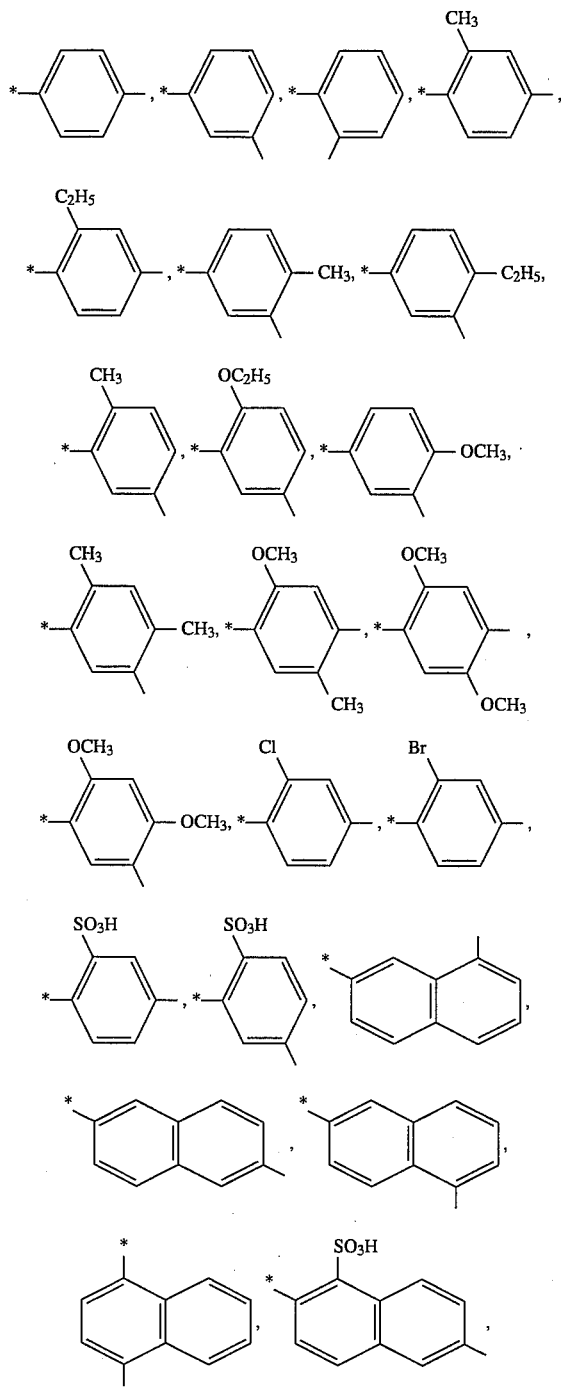

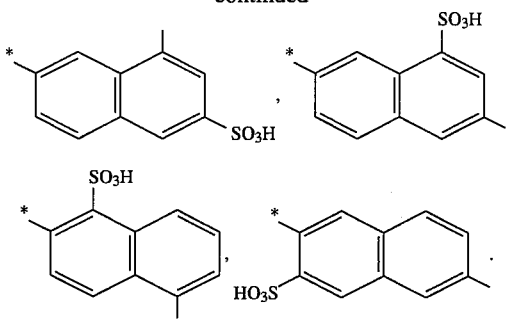

wherein the asterisk denotes a bond linking to

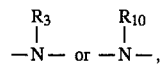

and the like.

Specific examples of the group capable of being split by the action of an alkali represented by $L_1$, $L_2$ and $L_3$ in the fiber reactive groups represented by $Z_1$ to $Z_4$ are sulfuric acid ester group, thiosulfuric acid ester group, phosphoric acid ester group, acetic acid ester group, halogen atom and the like. $L_1$, $L_2$ and $L_3$ are the same or different. Among the compounds represented by the formulas (I), (II) and (III), preferred are those having sulfatoethylsulfonyl and mixtures of those having sulfatoethylsulfonyl and those having vinylsulfonyl as the fiber reactive group.

When unsubstituted or substituted lower alkyl is selected as any of $R_1$, $R_2$, $R_3$, $R_8$, $R_9$ and $R_{10}$, it is preferably unsubstituted or substituted alkyl having 1 to 4 carbon atoms. When the lower alkyl is substituted, the substituent is preferably hydroxy, cyano, alkoxy, alkoxycarbonyl, alkylcarbonyloxy, sulfo or sulfamoyl. preferably, $R_1$, $R_2$, $R_3$, $R_8$, $R_9$ and $R_{10}$ are independently hydrogen, methyl, ethyl, n-propyl, isopropyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxymethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl, etc. Of these, hydrogen, methyl and ethyl are particularly preferred.

In the case where any of two or more of $R_1$, $R_2$, $R_3$, $R_8$, $R_9$ and $R_{10}$ are lower alkyl, they are the same or different.

The dioxazine compounds of the formulas (I) and (II) used in the invention include known compounds disclosed in, for example, JP-A-4-28769 and JP-A-1-185370, respectively. They can be produced according to the procedures described in the description of these patents or analogous procedures thereof. On the other hand, the anthraquinone compounds of the formula (III), which include C. I. Reactive Blue 19, are known compounds disclosed in, for example, JP-A-60-108472.

The dioxazine and anthraquinone compounds contained in the reactive dye composition of the present invention each exist in the form of a free acid or a salt thereof. Preferably, they are in the form of alkali metal salt or alkaline earth metal salt, and particularly preferably in the form of sodium salt or lithium salt.

The reactive dye composition of the present invention preferably comprises a mixture of at least one dioxazine compound of formula (I) and at least one dioxazine compound of formula (II). Although the compounding ratio thereof is not particularly limited, the amount in weight basis of one dioxazine compound is preferably up to 100 times and more preferably up to 75 times that of the other dioxazine compound. In the present invention, it is preferred that the amount in weight basis of the dioxazine compound of the formula (II) is preferably from 0.05 to 100 times and more preferably from 0.2 to 20 times that of the dioxazine compound of the formula (I).

The compounding ratio of at least one dioxazine compound of the formula (I), or at least one dioxazine compound of the formula (II) or a mixture of the dioxazine compounds of the formulas (I) and (II) to at least one anthraquinone compound of the formula (III) is not particularly limited. The amount in weight basis of the anthraquinone compound group (III) is preferably from 0.01 to 90 times and more preferably from 0.05 to 50 times that of any one of the dioxazine compound group (I) or/and (II).

A method for blending at least one dioxazine compound (I) or (II) or the mixture of the dioxazine compounds (I) and (II) with at least one anthraquinone compound (III) is not particularly limited. The blending may be carried out either prior to or in the course of dyeing of the fiber materials.

In order to obtain a desired color, the reactive dye composition of the present invention can be used in combination with at least one of other blue color components and yellow and red color components. The blue, yellow and red color components to be mixed with the present reactive dye composition is not particularly limited. Any known reactive dyes may be used for this purpose. The usable reactive dyes include those having one or more reactive groups selected from sulfatoethylsulfone group, vinylsulfone group, monochlorotriazine group, dichlorotriazine group, monofluorotriazine group, mononicotiniotriazine group, monocarbamoylpyridiniotriazine group and difluoromonochloropyrimidine group. Many of those are marketed under the commercial name of Sumifix, Sumifix Supra, Remazol, Levafix, Procion, Cibacron, Basilen, Drimarene, Kayacion, Kayacelon React. etc. and disclosed in, for example, JP-A-50-178, 56-9483, 56-15481, 56-118976, 56-128380, 57-2365, 57-89679, 57-143360, 59-15451, 58-191755, 59-96174, 59-161463, 60-6754, 60-123559, 60-229957, 60-260654, 61-155469, 63-77974, 63-225665 and 3-770.

The reactive dye composition of the present invention may contain an inorganic salt such as anhydrous sodium sulfate, sodium chloride and the like, a dispersant, a solubility improver, a dusting inhibitor, a pH stabilizer, a sequestering agent such as polyphosphate and the like, an antifoaming agent, water other known dyeing assistants, and the like.

The reactive dye composition of the present invention is not particularly limited in its form. It may have a known form such as powder, granule and liquid.

The cellulose fiber materials to which the reactive dye composition of the present invention is applied are not particularly limited. They include natural and regenerated cellulose fibers such as cotton, linen, flax, jute, ramie fiber, viscose rayon, Bemberg fiber and the like. The cellulose fiber-containing fiber materials include cotton/polyester union fabric, cotton/nylon union fabric, cotton/wool, cotton/silk union fabric, and the like.

In the present invention, the dyeing can be carried out by known methods including, for example, exhaustion dyeing, continuous dyeing, cold-pad-batch dyeing and printing methods. As the exhaustion dyeing, a method which comprises using a known inorganic neutral salt such as anhydrous sodium sulfate, sodium chloride or the like and a known acid binding agent can be referred to. The acid binding agent suitable for fixing the dye on cellulose fiber is, for example, a water-soluble basic salt formed between an alkali metal or alkaline earth metal and an inorganic salt, an organic acid or a compound releasing an alkali upon heating. Preferable acid binding agents are alkali metal hydroxides and alkali metal salts of inorganic or organic acid having a weak or medium acidity. Of these, sodium salts and potassium salts are particularly preferred. Specific examples of such acid binding agent are sodium hydroxide, potassium hydroxide, sodium bicarbonate, sodium carbonate, sodium formate, potassium carbonate, sodium primary, secondary and tertiary phosphates, sodium silicate, sodium trichloroacetate, and liquid acid binding agents marketed under the trade names of Espolon A-171, Contron-L, BLENON, AM-117, etc. There is no limitation on the amounts of the inorganic neutral salt and acid binding agent. Usually, the inorganic neutral salt can be used in an amount of at least 1 g/liter. Although it may be used in an amount of 100 g/liter or more, a small amount of 40 g/liter or less may be enough to carry out the dyeing in the present invention, because the present dye composition is not so sensitive against change of the salt concentration. The inorganic neutral salt and acid binding agent may be fed into the dyeing bath either in one portion or in portions in the conventional manner. Further, dosing may be carried out by a mechanical control. Dyeing assistants such as level dyeing agents, retarding agents, dye bath lubricants and the like may be used according to known methods. The dyeing temperature is usually 40°–90° C. and preferably 40°–70° C.

The reactive dye composition of the present invention is used for dyeing a cellulose fiber material or a cellulose fiber-containing fiber material to obtain a dyed product having neither unevenness nor dyeing spot with excellent reproducibility. In accordance with the present invention, a dyed product of high color yield can be obtained even with a small amount of inorganic neutral salts. Further, the reactive dye composition of the present invention is robust against changes in dyeing temperature, amount of the acid-binding agent and liquor ratio. Furthermore, the reactive composition of the present invention is excellent in build-up property, and can produce a dyed product of a clear blue color excellent in light fastness, perspiration-light fastness and wet fastness.

The present invention will be explained in more detail by referring to the following examples, which are only illustrative. In the examples, percent is by weight.

EXAMPLE 1

In a wince dyeing machine was set 100 kg of a knit cotton fabric. The liquor ratio and water temperature were adjusted to 1:15 and 60° C., respectively.

Then, 0.06 kg of a dye represented by formula (1) in the free acid form:
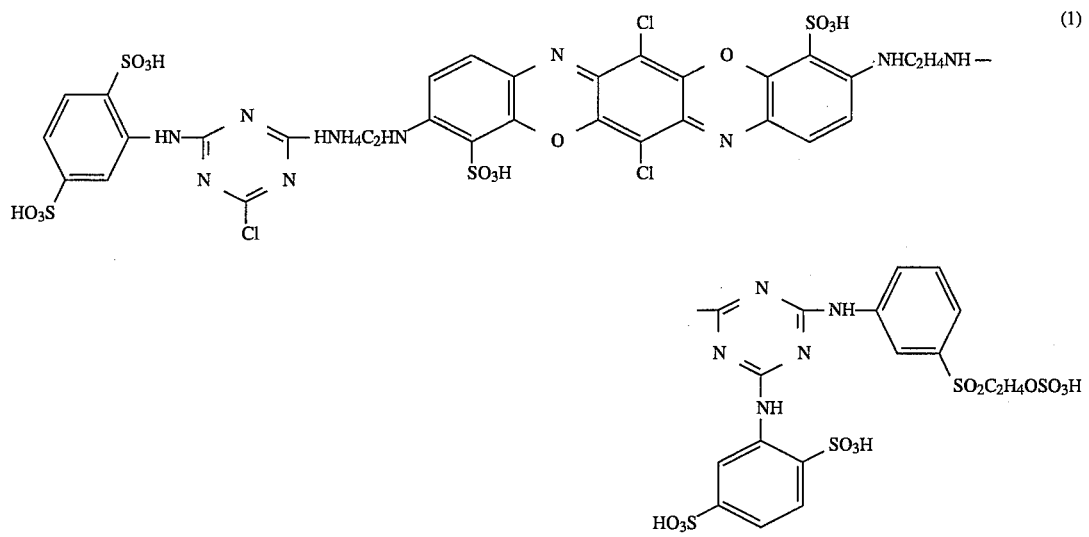
which had been dissolved previously, 0.54 kg of a dye represented by formula (2) in the free acid form:
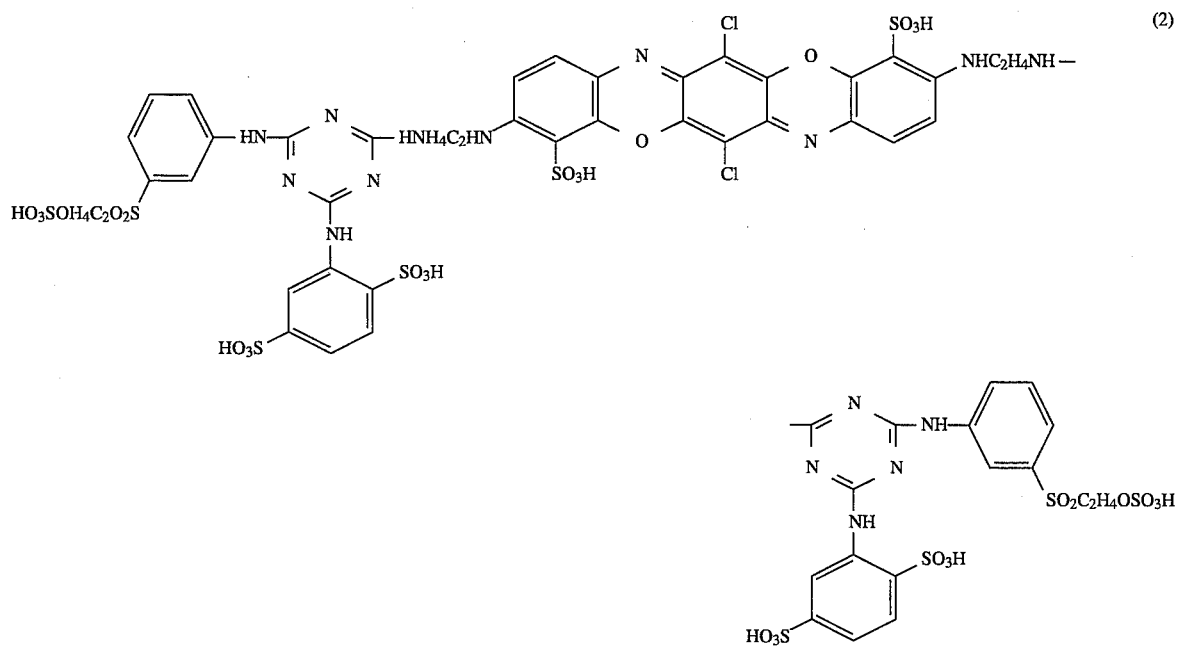
which had been dissolved previously, and 2.4 kg of a dye represented by formula (3) in the free acid form:

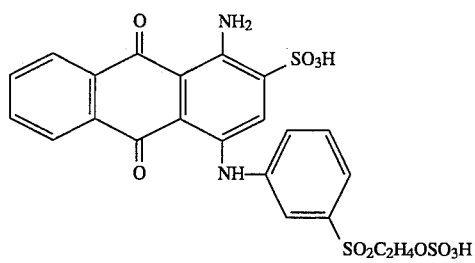

(3)

which had been dissolved previously were thrown into the bath in the conventional manner. Further, 45 kg of anhydrous sodium sulfate was thrown into the bath at this temperature. After treating the knit fabric at this temperature for 20 minutes, 30 kg, in the total, of sodium carbonate was added to the bath in two portions in the conventional manner. Then, the knit fabric was treated at this temperature for 60 minutes to complete the dyeing. The dyed product thus obtained showed a spotless, uniform and clear blue color. When the abovementioned dyeing process was repeated, a good reproducibility of dyeing was exhibited.

EXAMPLE 2

In a low liquor ratio type liquid flow dyeing apparatus was set 200 kg of a knit fabric made of rayon fiber, and the liquor ratio and water temperature were adjusted to 1:6 and 60° C., respectively Then, 0.05 kg of a dye represented by formula (4) in the free acid form:

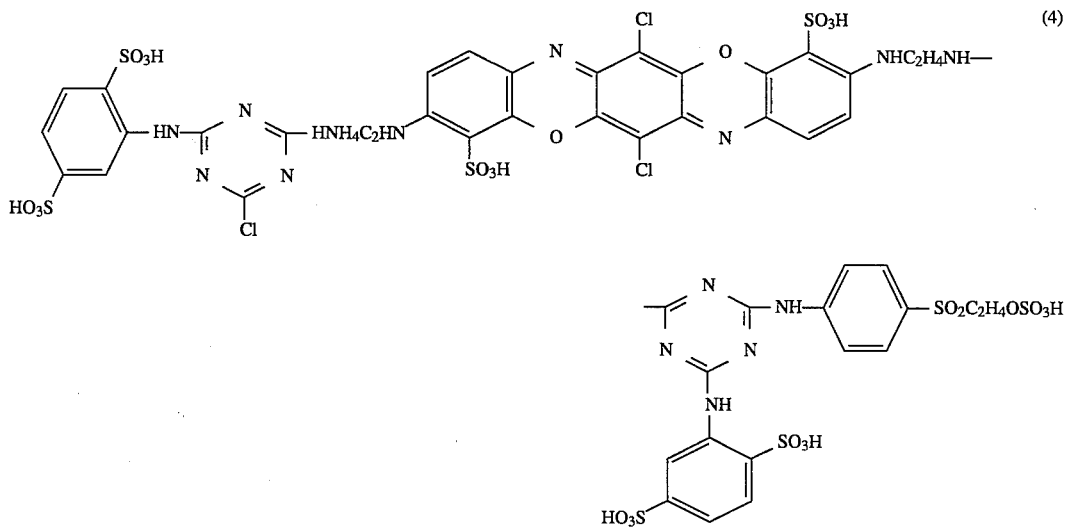

(4)

which had been dissolved previously, 0.32 kg of a dye represented by formula (5) in the free acid form:

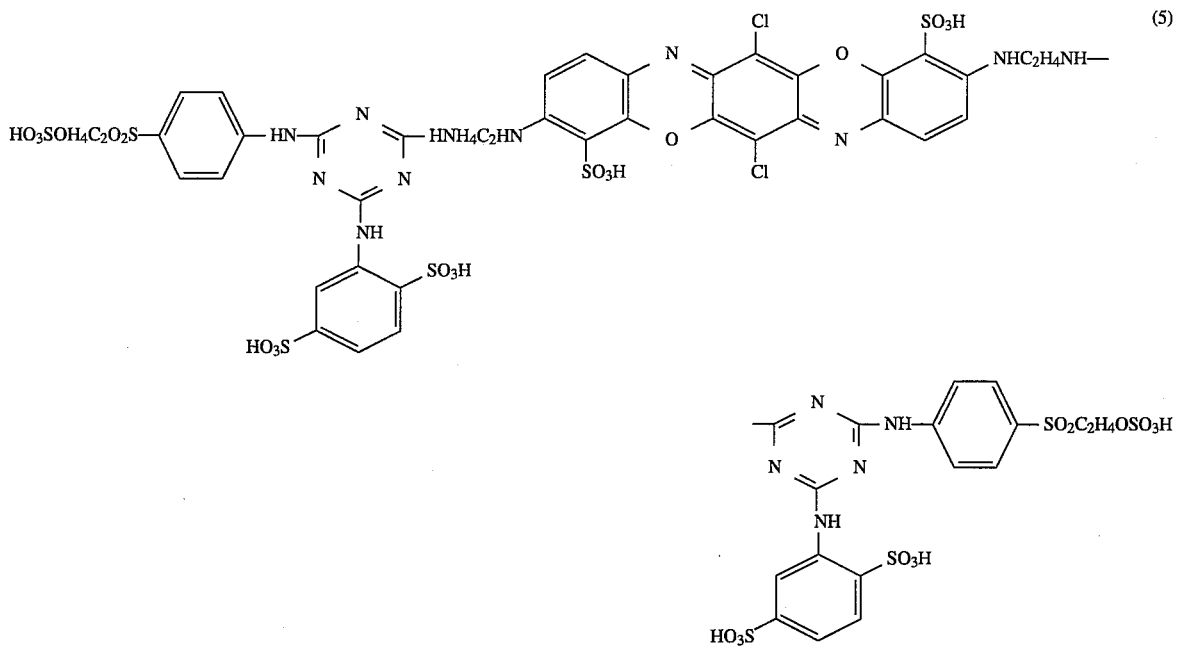

which had been dissolved previously, 2.63 kg of a dye represented by formula (6) in the free acid form:

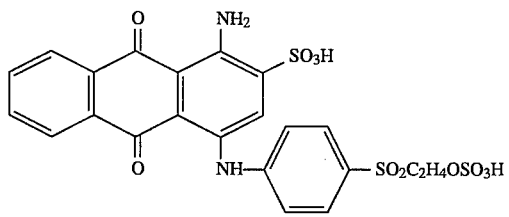

which had been dissolved previously, and 18 kg of anhydrous sodium sulfate were thrown into the bath in the conventional manner. After treating the knit fabric at this temperature for 30 minutes, 4.8 kg of sodium carbonate was thrown into the bath in the conventional manner. Then, the knit fabric was treated at this temperature for 40 minutes to complete the dyeing process. At this time, no undissolved matter such as dye agglomerate and the like was found in the bath, and the dyed product thus obtained showed a spotless, uniform and clear blue color. When the dyeing process mentioned above was repeated, a good reproducibility of dyeing was exhibited.

EXAMPLE 3

One hundred kilograms of cotton yarn was set in a cheese dyeing apparatus, and liquor ratio and water temperature were adjusted to 1:10 and 65° C., respectively.

Then, 1.0 kg of a dye represented by formula (7) in the free acid form:

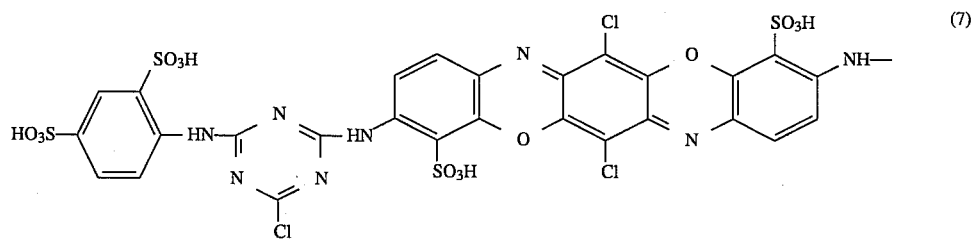

-continued

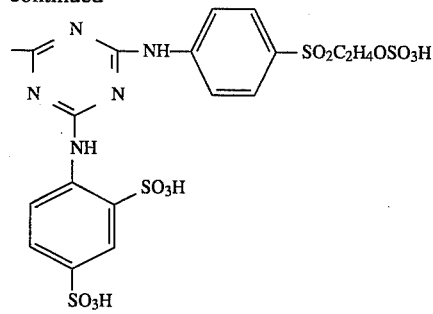

(15)

which had been dissolved previously, 1.0 kg of a dye represented by formula (8) in the free acid form:

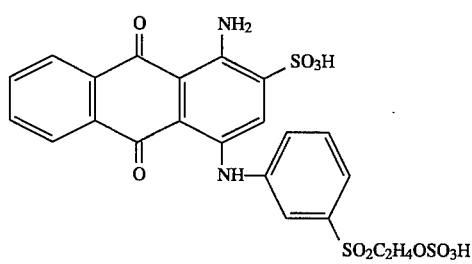

(8)

which had been dissolved previously, 1.5 kg of a yellow-colored dye represented by formula (9) in the free acid form:

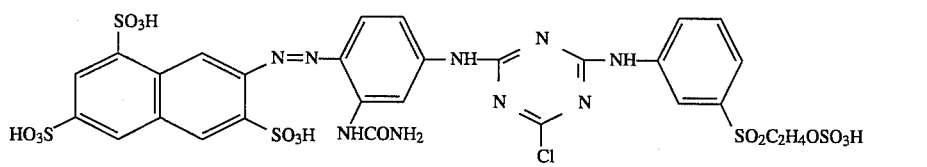

(9)

which had been dissolved previously, 1 kg of a red-colored dye represented by formula (10) in the free acid form:

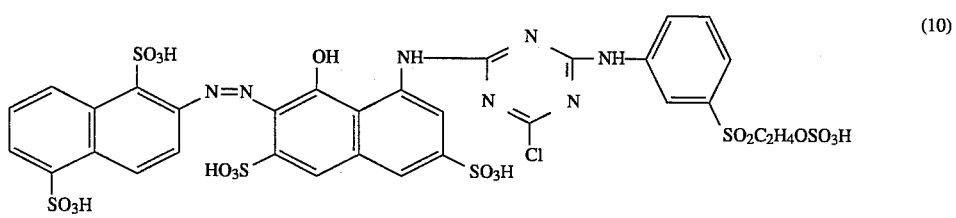

(10)

which had been dissolved previously and 30 kg of sodium chloride were thrown into the bath in the conventional manner. After treating the yarn at this temperature for 30 minutes, 10 kg of sodium tertiary phosphate was added to the bath in the conventional manner. Then, the yarn was treated at the same temperature as above for 60 minutes to complete the dyeing. The dyed product thus obtained showed a spotless, uniform and clear brown color. When the above-mentioned dyeing process was repeated, reproducibility of dyeing was good.

EXAMPLE 4

In a high pressure liquid flow type dyeing apparatus was set 200 kg of a union knit fabric constituted of 50% of cotton fiber and 50% of polyester fiber. Liquor ratio was adjusted to 1:10, water temperature was adjusted to 80° C., and pH was adjusted to 5 with acetic acid. Then, 0.4 kg of a mixture of disperse dyes represented by formulas:

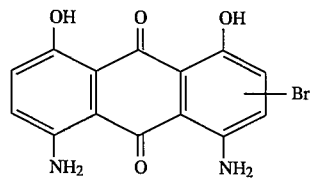

(11)

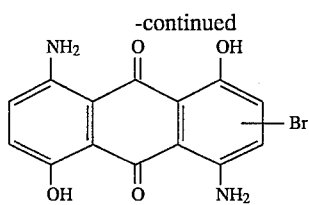

which had sufficiently been dispersed in water previously, and 0.5 kg of a disperse dye represented by formula (12):

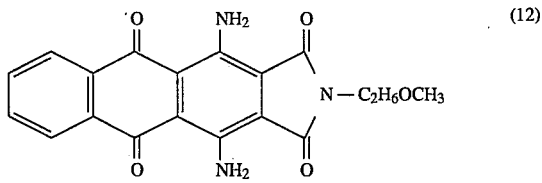

which had sufficiently been dispersed in water previously, were added to the bath together with a dispersant solution containing 0.2 kg of a dispersant (Sumipon TF, manufactured by Sumitomo Chemical Co.). The mixture was heated to 130° C. in 40 minutes, and the polyester part of the knit fabric was dyed at this temperature for 30 minutes. Then, the dye solution was discharged, fresh water was fed, and the liquor ratio and water temperature were adjusted to 1:10 and 60° C., respectively. Then, 0.1 kg of a dye represented by formula (1) in the free acid form which had been dissolved previously, 0.4 kg of a dye represented by formula (2) in the free acid form which had been dissolved previously, 1.0 kg of a dye represented by formula (3) in the free acid form which had been dissolved previously and 60 kg of anhydrous sodium sulfate were added to the bath at the same temperature as above, and the fabric was treated at this temperature for 45 minutes to complete the dyeing. As a result, a good dyed product was obtained, and it showed a spotless, uniform and clear blue color. When the above-mentioned dyeing was repeated, reproducibility of dyeing was good.

EXAMPLE 5

One hundred kilograms of a knit cotton fabric was set in a wince dyeing apparatus, and liquor ratio and water temperature were adjusted to 1:15 and 50° C., respectively. On the other hand, 1.0 kg of a dye represented by formula (13) in the free acid form:

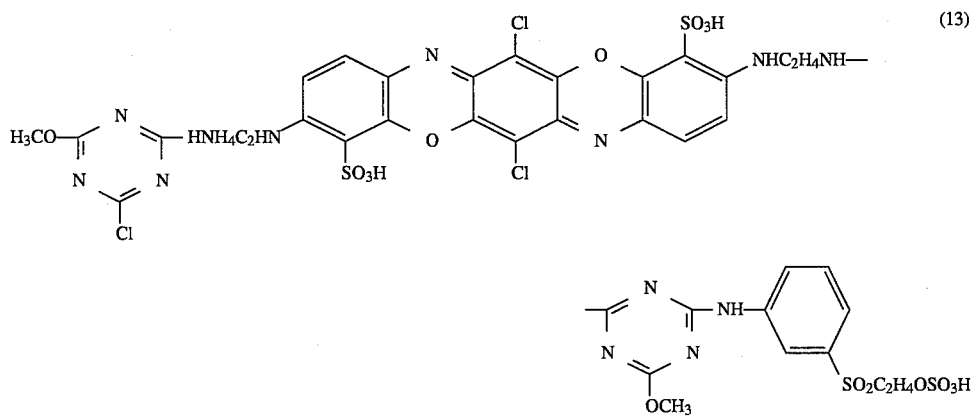

and 9.0 kg of a dye represented by formula (14) in the free acid form:

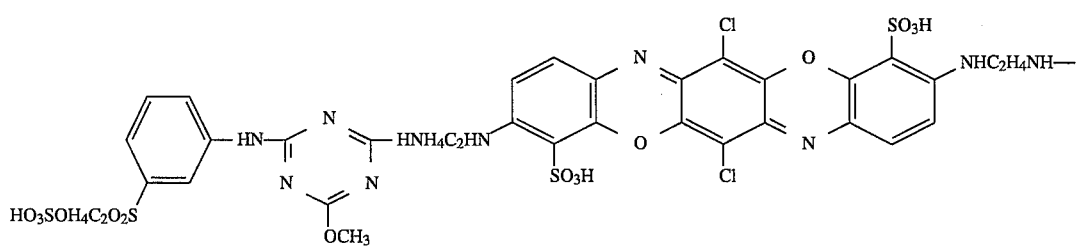

-continued

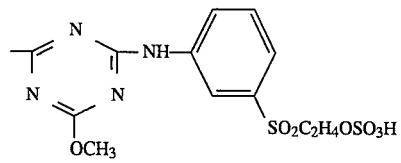

and 90.0 kg of a dye represented by formula (3) in the free acid form were thoroughly mixed together, and 1.0 kg of the dye composition thus obtained was dissolved in hot water and cooled to 25° C. The solution thus obtained was added to the bath together with 1.5 kg of a dye represented by formula (15) in the free acid form:

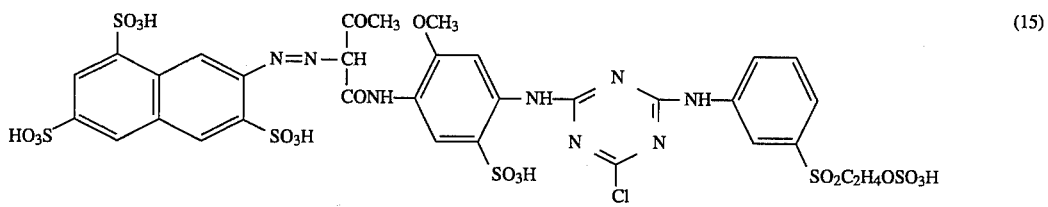

(15)

which had been dissolved previously, 3 kg of a dimethyl-naphthalenesulfonic acid-formaldehyde condensate (sodium salt) having a sulfonation degree of 110% and an average condensation degree of 1.8 and 45 kg of anhydrous sodium sulfate in the conventional manner. After treating the knit fabric at the above-mentioned bath temperature for 20 minutes, 30 kg of sodium carbonate was added to the bath in the conventional manner. Then, the knit fabric was treated at the same temperature as above for 60 minutes to complete the dyeing. The dyed product thus obtained was finished by washing it in the conventional manner. The dyed product thus obtained showed a spotless, uniform, clear green color. When the dyeing process was repeated, the reproducibility of dyeing was good.

EXAMPLE 6

One hundred kilograms of a knit cotton fabric was set in a liquid flow type dyeing apparatus, and liquor ratio and water temperature were adjusted to 1:8 and 60° C., respectively. Then, 0.01 kg of a dye represented by formula (1) in the free acid form which had been dissolved previously, 0.72 kg of a dye represented by formula (2) in the free acid form which had been dissolved previously, 2.27 kg of a dye represented by formula (3) in the free acid form which had been dissolved previously and 20 kg of anhydrous sodium sulfate were added to the bath in the conventional manner, and the knit fabric was treated at this temperature for 20 minutes. After adding 4 kg of sodium carbonate to the bath in the conventional manner, the knit fabric was treated at that temperature for 15 minutes. Then, 1.6 liters of 40° Baume caustic soda solution was added to the bath in the conventional manner, and the knit fabric was treated at the same temperature as above for 60 minutes to complete the dyeing. The dyed product was finished by washing it in the conventional manner. The dyed product thus obtained had a spotless, uniform and clear blue color. When the above-mentioned dyeing process was repeated, the reproducibility of dyeing was good.

EXAMPLE 7

One hundred kilograms of a knit cotton fabric was set in a wince dyeing machine, and the liquor ratio and water temperature were set to 1:15 and 60° C., respectively After adding 0.6 kg of a dye represented by formula (2) in the free acid form which had been dissolved previously and 1.4 kg of a dye represented by formula (3) in the free acid form which had been dissolved previously to the bath in the conventional manner, 45 kg of anhydrous sodium sulfate was added to the bath in the conventional manner at this temperature. Then, the knit fabric was treated at the same temperature as above for 20 minutes. After adding 30 kg of sodium carbonate to the bath in the conventional manner, the knit fabric was treated at the same temperature as above for 60 minutes to complete the dyeing. The dyed product thus obtained had a spotless, uniform and clear blue color. When the above-mentioned dyeing process was repeated, the reproducibility of dyeing was good.

EXAMPLE 8 TO 45

Dyes were thoroughly mixed together at the compounding ratios shown in Tables 1 to 38. A 2.0 kg portion of each dye composition thus obtained was dissolved in hot water and the resulting solution was cooled to 25° C., with which a dyeing process was carried out by repeating the procedure of Example 1. The dyed products thus obtained all had a spotless, uniform and clear blue color. When the dyeing processes were repeated, the reproducibility of dyeing was good in all the cases.

In the tables, the mark * in the columns of $X_1$ and $X_2$ signifies a bond linking to

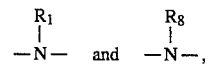

respectively, the mark  in the column of $Y_1$ signifies a bond linking to $Z_1$, and the mark * in the column of $Y_2$ signifies a bond linking to $Z_2$ and $Z_3$.

TABLE 1

Example 8

|  | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 11% | 1 | —H | *-$C_2H_4$— | —H | —H | 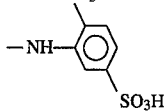 | —Cl |  | —$SO_2C_2H_4OSO_3H$ |

|  | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 22% | 1 | —H | *-$C_2H_4$— | —H | —H | —$OCH_3$ |  | —$SO_2C_2H_4OSO_3H$ | —$SO_2C_2H_4OSO_3H$ |
| Compound of formula III | Compounding ratio 67% | | | | | | 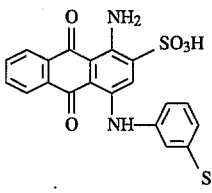 colspan | | | |

TABLE 2

Example 9

|  | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 2% | 1 | —H | *-$C_2H_4$— | —H | —H |  | —Cl | 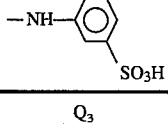 | —$SO_2C_2H_4OSO_3H$ |

|  | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 18% | 1 | —H | *-$C_2H_4$— | —H | —H | 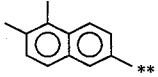 | 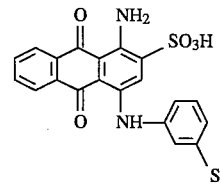 | —$SO_2C_2H_4OSO_3H$ | —$SO_2C_2H_4OSO_3H$ |
| Compound of formula III | Compounding ratio 80% | | | | | | 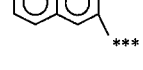 | | | |

TABLE 3

Example 10

|  | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 50% | 1 | —H | *-$C_2H_4$— | —H | —H | 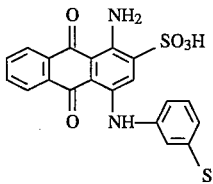 | —Cl |  | —$SO_2C_2H_4OSO_3H$ |

|  | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|

TABLE 3-continued

Example 10

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula II | Compounding ratio 21% | 1 | —H | *-$C_2H_4$— | —H | —H | 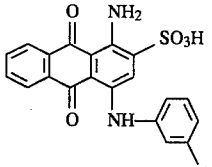 | —OCH₃ (with ortho substituent) | —$SO_2C_2H_4OSO_3H$ | —$SO_2C_2H_4OSO_3H$ |

| | | | | | | | | | | |
|---|---|---|---|---|---|---|---|---|---|---|
| Compound of formula III | Compounding ratio 29% | | | | | | 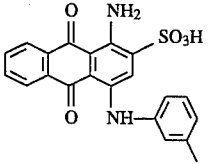 | | | |

TABLE 4

Example 11

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 83% | 1 | —H | *-$C_2H_4$— | —H | —H | —NH—C₆H₃(SO₃H)₂ | —Cl | C₆H₃(SO₃H)** | —$SO_2CH=CH_2$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 8% | 1 | —H | *-$C_2H_4$— | —H | —H | —NH—C₆H₃(SO₃H)₂ | C₆H₃(SO₃H)*** | —$SO_2CH=CH_2$ | —$SO_2CH=CH_2$ |

| | | | | | | | | | | |
|---|---|---|---|---|---|---|---|---|---|---|
| Compound of formula III | Compounding ratio 9% | | | | | | anthraquinone derivative | | | |

TABLE 5

Example 12

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 60% | 0 | — | — | —H | —H | —NH—C₆H₃(SO₃H)₂ | —Cl | C₆H₄** | —$SO_2C_2H_4OSO_3H$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 17% | 0 | — | — | —H | —H | —NH—C₆H₃(SO₃H)₂ | C₆H₄** | —$SO_2C_2H_4OSO_3H$ | —$SO_2CH=CH_2$ |

TABLE 5-continued

Example 12

| | | |
|---|---|---|
| Compound of formula III | Compounding ratio 23% |  |

TABLE 6

Example 13

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 4% | 0 | — | — | —H | —$C_2H_5$ |  | —Cl |  | —$SO_2C_2H_4OSO_3H$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 16% | 0 | — | — | —H | —$C_2H_5$ |  | 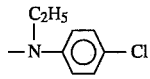 | —$SO_2C_2H_4OSO_3H$ | —$SO_2C_2H_4OSO_3H$ |

| | | |
|---|---|---|
| Compound of formula III | Compounding ratio 80% |  |

TABLE 7

Example 14

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 1% | 1 | —H | *-$C_2H_4$— | —H | —H | 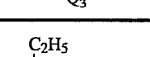 | —Cl | ** | —$SO_2C_2H_4OSO_3H$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 9% | 1 | —H | *-$C_2H_4$— | —H | —H | (same as Q₁ above) | (phenyl)*** | —$SO_2C_2H_4OSO_3H$ | —$SO_2C_2H_4OSO_3H$ |

| | | |
|---|---|---|
| Compound of formula III | Compounding ratio 90% | (anthraquinone dye structure) |

TABLE 8

Example 15

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 0.3% | 1 | —H | *-$C_2H_4$— | —H | —H | 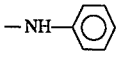 | —Cl | 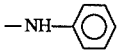 | —$SO_2C_2H_4OSO_3H$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 5.7% | 1 | —H | *-$C_2H_4$— | —H | —H | 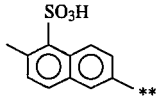 | 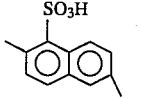 | —$SO_2C_2H_4OSO_3H$ | —$SO_2C_2H_4OSO_3H$ |
| Compound of formula III | Compounding ratio 94% | | | | | | 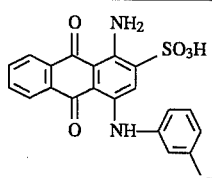 | | | |

TABLE 9

Example 16

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 70% | 0 | — | — | —H | —H | 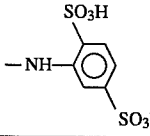 | —Cl | 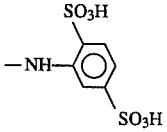 | —$SO_2C_2H_4OSO_3H$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 13% | 0 | — | — | —H | —H | 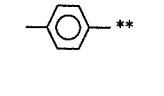 | 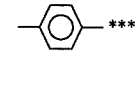 | —$SO_2C_2H_4OSO_3H$ | —$SO_2C_2H_4OSO_3H$ |
| Compound of formula III | Compounding ratio 17% | | | | | | 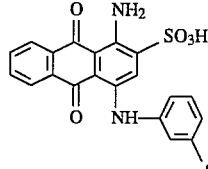 | | | |

TABLE 10

Example 17

| | m | $R_1$ | $X_1$ | $R_2$ | $R_3$ | $Q_1$ | $Q_2$ | $Y_1$ | $Z_1$ |
|---|---|---|---|---|---|---|---|---|---|
| Compound of formula I<br>Compounding ratio 13% | 1 | —H | *—C₆H₃(CH₃)(SO₃H)— | —H | —H | —NH—C₆H₄—SO₃H | —Cl | —C₆H₄—** | —SO₂C₂H₄OPO₃H₂ |

| | n | $R_8$ | $X_2$ | $R_9$ | $R_{10}$ | $Q_3$ | $Y_2$ | $Z_2$ | $Z_3$ |
|---|---|---|---|---|---|---|---|---|---|
| Compound of formula II<br>Compounding ratio 23% | 1 | —H | *—C₆H₃(SO₃H)— | —H | —H | —NH—C₆H₄—SO₃H | —C₆H₄—*** | —SO₂C₂H₄OPO₃H₂ | —SO₂C₂H₄OPO₃H₂ |

Compound of formula III
Compounding ratio 64%

[Anthraquinone structure with NH₂, SO₃H substituents and NH—C₆H₄—SO₂CH=CH₂ group]

TABLE 11

Example 18

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 20% | 0 | — | — | —H | —H |  | —Cl |  | —SO$_2$C$_2$H$_4$OSO$_3$H |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 25% | 0 | — | — | —H | —H |  |  | —SO$_2$C$_2$H$_4$OSO$_3$H | —SO$_2$C$_2$H$_4$OSO$_3$H |

| Compound of formula III | Compounding ratio 55% | 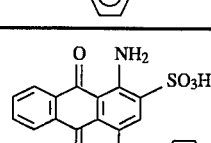 |
|---|---|---|

TABLE 12

Example 19

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 90% | 0 | — | — | —H | —H | (naphthalene-NH- with 2 SO$_3$H) | —Cl | phenyl** | —SO$_2$C$_2$H$_4$OSO$_3$H |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 5% | 0 | — | — | —H | —H | (—NH-phenyl with 2 SO$_3$H) | phenyl*** | —SO$_2$C$_2$H$_4$OSO$_3$H | —SO$_2$CH=CH$_2$ |

| Compound of formula III | Compounding ratio 5% | (anthraquinone derivative with NH, SO$_3$H, NH-phenyl-SO$_2$C$_2$H$_4$OSO$_3$H) |
|---|---|---|

TABLE 13

Example 20

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 0% | — | — | — | — | — | — | — | — | — |

TABLE 13-continued

Example 20

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 18% | 1 | —H | *-$C_2H_4$— | —H | —H | 2-amino-naphthalene-3,6,8-trisulfonic acid residue (—NH—, with $SO_3H$ groups) | phenyl (***) | —$SO_2CH=CH_2$ | —$SO_2CH=CH_2$ |
| Compound of formula III | Compounding ratio 82% | | | | | | 1-amino-4-(3-(β-sulfatoethylsulfonyl)anilino)anthraquinone-2-sulfonic acid residue ($SO_2C_2H_4OSO_3H$) | | | |

TABLE 14

Example 21

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 40% | 1 | —H | *—$C_2H_4$— | —H | —$C_2H_5$ | —NH— naphthalene($SO_3H$)($SO_3H$)($HO_3S$) | —Cl | phenyl** | —$SO_2CH=CH_2$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 20% | 1 | —H | *—(methylphenyl)—$SO_3H$ | —$CH_3$ | —$C_2H_5$ | —NH— naphthalene($SO_3H$)($SO_3H$)($HO_3S$) | phenyl*** | —$SO_2C_2H_4OSO_3H$ | —$SO_2CH=CH_2$ |

| Compound of formula III | Compounding ratio 40% |
|---|---|

TABLE 15

Example 22

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 40% | 1 | —H |  | —H | —H |  | —Cl |  | —SO₂CH=CH₂ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 0% | — | — | — | — | — | — | — | — | — |
| Compound of formula III | Compounding ratio 60% | | | | | 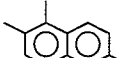 | | | | |

TABLE 16

Example 23

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 20% | 1 | —H | 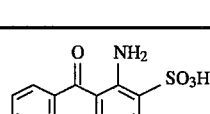 | —H | —H |  | —Cl |  | —SO₂C₂H₄OSO₃H |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 50% | 1 | —H |  | —H | —H | —OC₂H₅ | 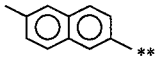 | —SO₂C₂H₄OSO₃H | —SO₂C₂H₄OSO₃H |
| Compound of formula III | Compounding ratio 30% | | | | | |  | | | |

TABLE 17

Example 24

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 8% | 1 | —H |  | —H | —H |  | —Cl | 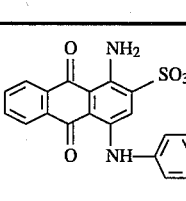 | —SO₂CH=CH₂ |

| | | n | $R_8$ | $X_2$ | $R_9$ | $R_{10}$ | $Q_3$ | $Y_2$ | $Z_2$ | $Z_3$ |

TABLE 17-continued

Example 24

| | | | | | | | | | | |
|---|---|---|---|---|---|---|---|---|---|---|
| Compound of formula II | Compounding ratio 72% | 1 | —H | *-C₆H₃(SO₃H)-CH₃ (at *) | —H | —H | —NH-C₆H₃(OCH₃)₂ | | —SO₂CH=CH₂ | —SO₂CH=CH₂ |

| | | |
|---|---|---|
| Compound of formula III | Compounding ratio 20% |  1-amino-2-sulfo-4-(4-(β-sulfatoethylsulfonyl)anilino)anthraquinone |

TABLE 18

Example 25

| | | m | R₁ | X₁ | R₂ | R₃ | Q₁ | Q₂ | Y₁ | Z₁ |
|---|---|---|---|---|---|---|---|---|---|---|
| Compound of formula I | Compounding ratio 45% | 1 | —H | *-C₂H₄— | —H | —H | —NHC₂H₅ | —F | 2-OCH₃-5-CH₃-phenyl (**) | —SO₂C₂H₄OSO₃H |

| | | n | R₈ | X₂ | R₉ | R₁₀ | Q₃ | Y₂ | Z₂ | Z₃ |
|---|---|---|---|---|---|---|---|---|---|---|
| Compound of formula II | Compounding ratio 22% | 1 | —H | *-C₂H₄— | —H | —H | —NHC₂H₅ | 2-OCH₃-5-CH₃-phenyl (***) | —SO₂C₂H₄OSO₃H | —SO₂C₂H₄OSO₃H |

| | | |
|---|---|---|
| Compound of formula III | Compounding ratio 33% | 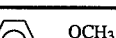 1-amino-2-sulfo-4-(3-(β-sulfatoethylsulfonyl)anilino)anthraquinone |

TABLE 19

Example 26

| | | m | R₁ | X₁ | R₂ | R₃ | Q₁ | Q₂ | Y₁ | Z₁ |
|---|---|---|---|---|---|---|---|---|---|---|
| Compound of formula I | Compounding ratio 0% | — | — | — | — | — | — | — | — | — |

| | | n | R₈ | X₂ | R₉ | R₁₀ | Q₃ | Y₂ | Z₂ | Z₃ |
|---|---|---|---|---|---|---|---|---|---|---|
| Compound of formula II | Compounding ratio 10% | 1 | —H | *-C₃H₆— | —H | —H | —NHC₂H₄SO₃H | 2-OCH₃-5-CH₃-phenyl (***) | —SO₂C₂H₄OSO₃H | —SO₂C₂H₄OSO₃H |

TABLE 19-continued

Example 26

| | | |
|---|---|---|
| Compound of formula III | Compounding ratio 90% | 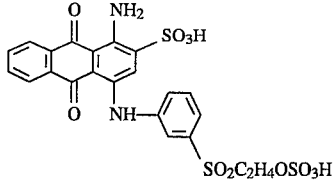 |

TABLE 20

Example 27

| | | m | R₁ | X₁ | R₂ | R₃ | Q₁ | Q₂ | Y₁ | Z₁ |
|---|---|---|---|---|---|---|---|---|---|---|
| Compound of formula I | Compounding ratio 10% | 0 | — | — | —H | —H | CH₃<br> \|<br>—N—C₂H₄SO₃H | —Cl |  | —SO₂C₂H₄OSO₃H |

| | | n | R₈ | X₂ | R₉ | R₁₀ | Q₃ | Y₂ | Z₂ | Z₃ |
|---|---|---|---|---|---|---|---|---|---|---|
| Compound of formula II | Compounding ratio 85% | 0 | — | — | —H | —H | CH₃<br> \|<br>—N—C₂H₄SO₃H | OCH₃<br>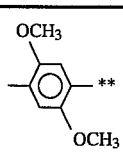<br>OCH₃ | —SO₂C₂H₄OSO₃H | —SO₂C₂H₄OSO₃H |

| | | |
|---|---|---|
| Compound of formula III | Compounding ratio 5% |  |

TABLE 21

Example 28

| | | m | R₁ | X₁ | R₂ | R₃ | Q₁ | Q₂ | Y₁ | Z₁ |
|---|---|---|---|---|---|---|---|---|---|---|
| Compound of formula I | Compounding ratio 4% | 1 | —H | 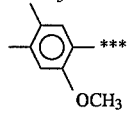 | —H | —H | SO₃H<br> | —Cl | 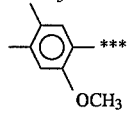 | —SO₂C₂H₄OSO₃H |

| | | n | R₈ | X₂ | R₉ | R₁₀ | Q₃ | Y₂ | Z₂ | Z₃ |
|---|---|---|---|---|---|---|---|---|---|---|
| Compound of formula II | Compounding ratio 16% | 1 | —H | 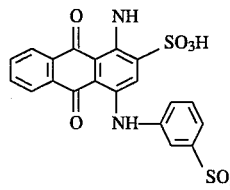 | —H | —H | —NHC₂H₄SO₃H | 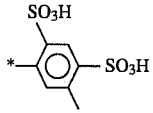 | —SO₂C₂H₄OSO₃H | —SO₂C₂H₄OSO₃H |

| | | |
|---|---|---|
| Compound of formula III | Compounding ratio 80% |  |

TABLE 22
Example 29
| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 60% | 1 | —H | 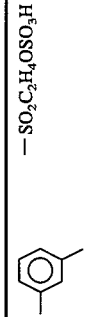 | —H | —CH$_3$ |  | —Cl | 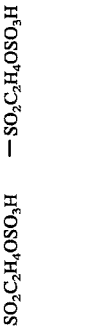 | —SO$_2$C$_2$H$_4$OSO$_3$H |
| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 17% | 1 | —H | 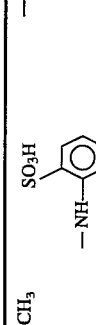 | —H | —H | 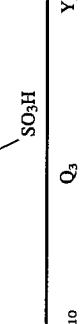 | 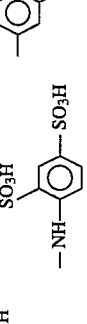 | —SO$_2$C$_2$H$_4$OSO$_3$H | —SO$_2$C$_2$H$_4$OSO$_3$H |
| | |
|---|---|
| Compound of formula III | Compounding ratio 23% 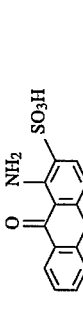 |
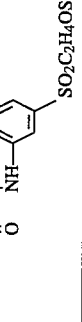

TABLE 23

Example 30

|  |  | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 0.7% | 1 | —H | *-$C_2H_4$— | —H | —H | —$OCH_3$ | —Cl | (m-phenylene)** | —$SO_2C_2H_4OSO_3H$ |

|  |  | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 7.3% | 1 | —H | *-$C_2H_4$— | —H | —H | —$OCH_3$ | (m-phenylene)*** | —$SO_2C_2H_4OSO_3H$ | —$SO_2C_2H_4OSO_3H$ |

| Compound of formula III | Compounding ratio 92% | 1-amino-2-sulfo-4-(3-(β-sulfatoethylsulfonyl)phenylamino)anthraquinone structure |
|---|---|---|

TABLE 24

Example 31

|  |  | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 10% | 1 | —H | *-$C_2H_4$— | —H | —H | —$OC_2H_5$ | —Cl | $SO_3H$-substituted phenylene** | —$SO_2CH=CH_2$ |

|  |  | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 50% | 1 | —H | *-$C_2H_4$— | —H | —H | —$OC_2H_5$ | $SO_3H$-substituted phenylene*** | —$SO_2CH=CH_2$ | —$SO_2CH=CH_2$ |

| Compound of formula III | Compounding ratio 40% | 1-amino-2-sulfo-4-(3-(β-sulfatoethylsulfonyl)phenylamino)anthraquinone structure |
|---|---|---|

TABLE 25

Example 32

|  |  | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 7% | 0 | — | — | —H | —H | —$OCH_3$ | —Cl | (phenylene)** | —$SO_2C_2H_4OSO_3H$ |

|  |  | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 33% | 0 | — | — | —H | —H | —$OCH_3$ | (phenylene)*** | —$SO_2C_2H_4OSO_3H$ | —$SO_2C_2H_4OSO_3H$ |

TABLE 25-continued

Example 32

| | | |
|---|---|---|
| Compound of formula III | Compounding ratio 60% | 1-amino-4-(3-(2-phosphonoxyethylsulfonyl)phenylamino)anthraquinone-2-sulfonic acid (anthraquinone with NH$_2$, SO$_3$H, and NH-phenyl-SO$_2$C$_2$H$_4$OPO$_3$H$_2$ substituents) |

TABLE 26

Example 33

| | | m | R$_1$ | X$_1$ | R$_2$ | R$_3$ | Q$_1$ | Q$_2$ | Y$_1$ | Z$_1$ |
|---|---|---|---|---|---|---|---|---|---|---|
| Compound of formula I | Compounding ratio 36% | 0 | — | — | —H | —C$_2$H$_5$ | —OCH$_3$ | —Cl | *m*-phenylene** | —SO$_2$C$_2$H$_4$OSO$_3$H |

| | | n | R$_8$ | X$_2$ | R$_9$ | R$_{10}$ | Q$_3$ | Y$_2$ | Z$_2$ | Z$_3$ |
|---|---|---|---|---|---|---|---|---|---|---|
| Compound of formula II | Compounding ratio 14% | 0 | — | — | —H | —C$_2$H$_5$ | —OCH$_3$ | *m*-phenylene*** | —SO$_2$C$_2$H$_4$OSO$_3$H | —SO$_2$C$_2$H$_4$OSO$_3$H |

| | | |
|---|---|---|
| Compound of formula III | Compounding ratio 50% | 1-amino-4-(3-vinylsulfonylphenylamino)anthraquinone-2-sulfonic acid (anthraquinone with NH$_2$, SO$_3$H, and NH-phenyl-SO$_2$CH=CH$_2$ substituents) |

TABLE 27

Example 34

| | | m | R$_1$ | X$_1$ | R$_2$ | R$_3$ | Q$_1$ | Q$_2$ | Y$_1$ | Z$_1$ |
|---|---|---|---|---|---|---|---|---|---|---|
| Compound of formula I | Compounding ratio 37% | 1 | —H | *-phenyl-SO$_3$H | —H | —C$_2$H$_5$ | —OCH$_3$ | —Cl | *p*-phenylene** | —SO$_2$C$_2$H$_4$OSO$_3$H |

| | | n | R$_8$ | X$_2$ | R$_9$ | R$_{10}$ | Q$_3$ | Y$_2$ | Z$_2$ | Z$_3$ |
|---|---|---|---|---|---|---|---|---|---|---|
| Compound of formula II | Compounding ratio 23% | 0 | — | — | —H | —C$_2$H$_5$ | —OCH$_3$ | *p*-phenylene*** | —SO$_2$C$_2$H$_4$OSO$_3$H | —SO$_2$C$_2$H$_4$OSO$_3$H |

| | | |
|---|---|---|
| Compound of formula III | Compounding ratio 40% | 1-amino-4-(3-(2-sulfatoethylsulfonyl)phenylamino)anthraquinone-2-sulfonic acid (anthraquinone with NH$_2$, SO$_3$H, and NH-phenyl-SO$_2$C$_2$H$_4$OSO$_3$H substituents) |

TABLE 28

Example 35

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 5% | 1 | —H | *-$C_3H_6$— | —H | —H | —$OCH_3$ | —Cl | 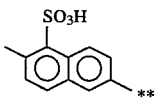 $SO_3H$ ** | —$SO_2C_2H_4OSO_3H$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 85% | 1 | —H | *-$C_2H_4$— | —H | —H | —$OCH_3$ | 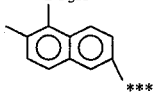 $SO_3H$ *** | —$SO_2C_2H_4OSO_3H$ | —$SO_2C_2H_4OSO_3H$ |

| | | | |
|---|---|---|---|
| Compound of formula III | Compounding ratio 10% | | 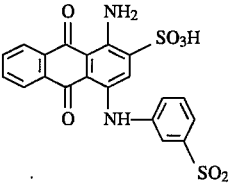 |

TABLE 29

Example 36

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 0% | — | — | — | — | — | — | — | — | — |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 30% | 0 | — | — | —H | —H | —$OCH_3$ | 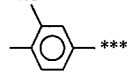 *** | —$SO_2C_2H_4OSO_3H$ | —$SO_2C_2H_4OSO_3H$ |

| | | | |
|---|---|---|---|
| Compound of formula III | Compounding ratio 70% | | 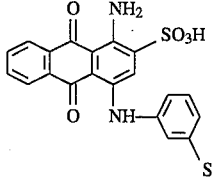 |

TABLE 30

Example 37

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 0.7% | 1 | —H | *-$C_2H_4$— | —H | —H | —$OCH_3$ | —F | 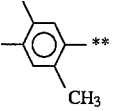 | —$SO_2C_2H_4OSO_3H$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 2.3% | 1 | —H | *-$C_2H_4$— | —H | —H | —$OC_2H_5$ | 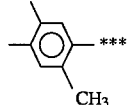 | —$SO_2C_2H_4OSO_3H$ | —$SO_2C_2H_4OSO_3H$ |

TABLE 30-continued

Example 37

| Compound of formula III | Compounding ratio 97% | 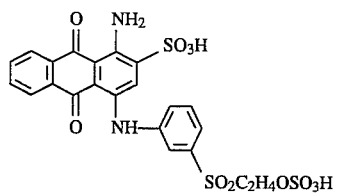 |
|---|---|---|

TABLE 31

Example 38

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 0.8% | 1 | —H | 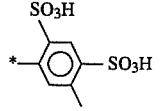 | —H | —H | —OCH$_3$ | —Cl | 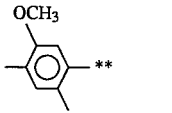 | —SO$_2$C$_2$H$_4$OSO$_3$H |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 9.2% | 1 | —H | 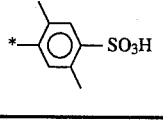 | —H | —H | —OCH | 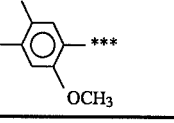 | —SO$_2$C$_2$H$_4$OSO$_3$H | —SO$_2$C$_2$H$_4$OSO$_3$H |

| Compound of formula III | Compounding ratio 90% | 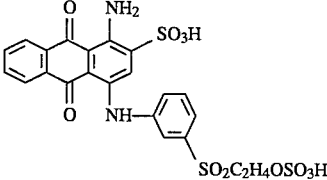 |
|---|---|---|

TABLE 32

Example 39

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 2% | 1 | —H | 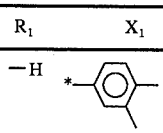 | —H | —H | —OC$_2$H$_5$ | —Cl |  | —SO$_2$C$_2$H$_4$OSO$_3$H |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 7% | 1 | —H | 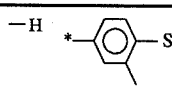 | —H | —H | —OC$_2$H$_5$ |  | —SO$_2$C$_2$H$_4$OSO$_3$H | —SO$_2$C$_2$H$_4$OSO$_3$H |

| Compound of formula III | Compounding ratio 91% | 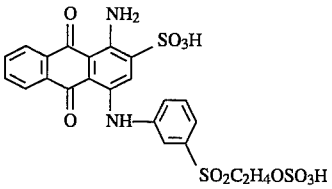 |
|---|---|---|

TABLE 33

Example 40

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 10% | 1 | —H | *-$C_2H_4$— | —H | —H | —$OC_2H_5$ | —Cl | 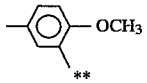 | —$SO_2C_2H_4OSO_3H$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 70% | 1 | —H | *-$C_2H_4$— | —H | —H | —$OC_2H_5$ | 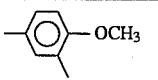 | —$SO_2C_2H_4OSO_3H$ | —$SO_2C_2H_4OSO_3H$ |

| Compound of formula III | Compounding ratio 20% | 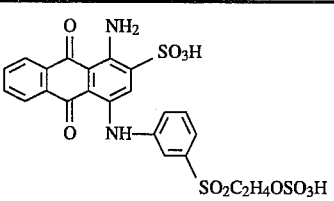 |
|---|---|---|

TABLE 34

Example 41

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 20% | 1 | —H | *-$C_3H_6$— | —H | —H | —$OC_2H_5$ | —Cl | 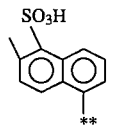 | —$SO_2C_2H_4OSO_3H$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 50% | 1 | —H | *-$C_3H_6$— | —H | —H | —$OC_2H_5$ | 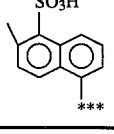 | —$SO_2C_2H_4OSO_3H$ | —$SO_2C_2H_4OSO_3H$ |

| Compound of formula III | Compounding ratio 30% | 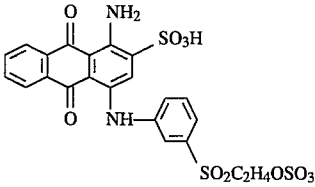 |
|---|---|---|

TABLE 35

Example 42

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 85% | 1 | —H | 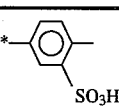 | —$CH_3$ | —H | —$OCH_3$ | —Cl |  | —$SO_2C_2H_4OSO_3H$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 7.6% | 1 | —H |  | —H | —H | —$OCH_3$ |  | —$SO_2CH=CH_2$ | —$SO_2CH=CH_2$ |

TABLE 35-continued

Example 42

| Compound of formula III | Compounding ratio 7.4% | 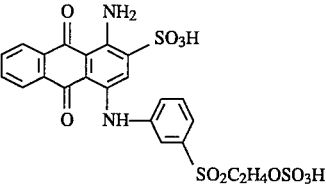 |
|---|---|---|

TABLE 36

Example 43

| | | m | R₁ | X₁ | R₂ | R₃ | Q₁ | Q₂ | Y₁ | Z₁ |
|---|---|---|---|---|---|---|---|---|---|---|
| Compound of formula I | Compounding ratio 6% | 1 | —H | *—C₆H₃—SO₃H | —C₂H₅ | —H | —OCH₃ | —Cl | —C₆H₄—** | —SO₂C₂H₄OSO₃H |

| | | n | R₈ | X₂ | R₉ | R₁₀ | Q₃ | Y₂ | Z₂ | Z₃ |
|---|---|---|---|---|---|---|---|---|---|---|
| Compound of formula II | Compounding ratio 19% | 1 | —H | *—C₆H₃—SO₃H | —H | —H | —OCH₃ | —C₆H₄—*** | —SO₂C₂H₄OSO₃H | —SO₂C₂H₄OSO₃H |

| Compound of formula III | Compounding ratio 75% | (anthraquinone structure with NH₂, SO₃H, NH-C₆H₄-SO₂C₂H₄OSO₃H) |
|---|---|---|

TABLE 37

Example 44

| | | m | R₁ | X₁ | R₂ | R₃ | Q₁ | Q₂ | Y₁ | Z₁ |
|---|---|---|---|---|---|---|---|---|---|---|
| Compound of formula I | Compounding ratio 15% | 0 | — | — | —H | —C₂H₅ | —OCH₃ | —F | —C₆H₄—** | —SO₂C₂H₄OSO₃H |

| | | n | R₈ | X₂ | R₉ | R₁₀ | Q₃ | Y₂ | Z₂ | Z₃ |
|---|---|---|---|---|---|---|---|---|---|---|
| Compound of formula II | Compounding ratio 30% | 0 | — | — | —H | —C₂H₅ | —OCH₃ | —C₆H₄—*** | —SO₂C₂H₄OSO₃H | —SO₂C₂H₄OSO₃H |

| Compound of formula III | Compounding ratio 55% | (anthraquinone structure with NH₂, SO₃H, NH-C₆H₄-SO₂C₂H₄OSO₃H) |
|---|---|---|

TABLE 38

Example 45

| | | m | $R_1$ | $X_1$ | $R_2$ | $R_3$ | $Q_1$ | $Q_2$ | $Y_1$ | $Z_1$ |
|---|---|---|---|---|---|---|---|---|---|---|
| Compound of formula I | Compounding ratio 80% | 0 | — | — | —H | —$C_2H_5$ | —$OCH_3$ | —Cl | ** | —$SO_2C_2H_4OSO_3H$ |

| | | n | $R_8$ | $X_2$ | $R_9$ | $R_{10}$ | $Q_3$ | $Y_2$ | $Z_2$ | $Z_3$ |
|---|---|---|---|---|---|---|---|---|---|---|
| Compound of formula II | Compounding ratio 10% | 0 | — | — | —H | —$C_2H_5$ | —$OCH_3$ | *** | —$SO_2C_2H_4OSO_3H$ | —$SO_2C_2H_4OSO_3H$ |

| Compound of formula III | Compounding ratio 10% |  |
|---|---|---|

What is claimed is:

1. A reactive dye composition comprising:

A) at least one member selected from the dioxazine compound group represented by the following formula (I) in the free acid form:

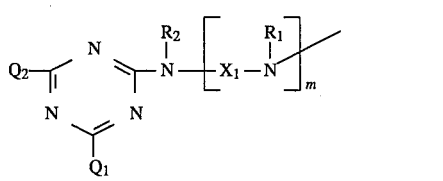

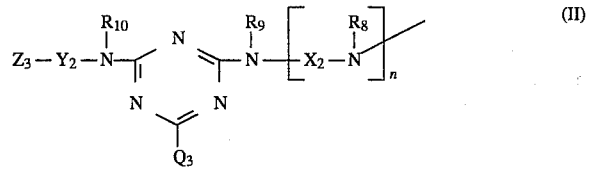

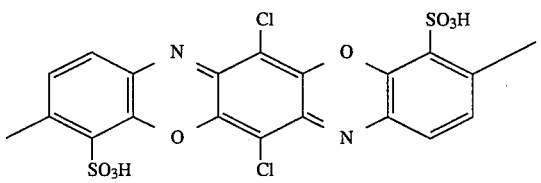

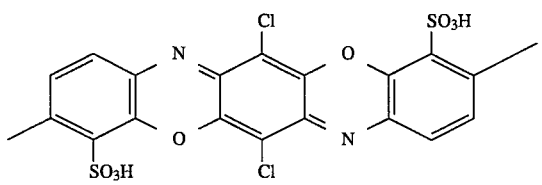

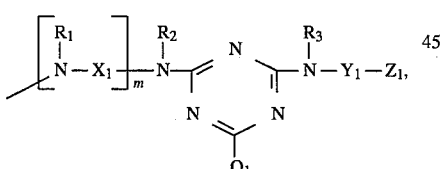

wherein $R_1$, $R_2$ and $R_3$ are independently hydrogen or unsubstituted lower alkyl, $X_1$ is an unsubstituted or substituted and straight, branched or cyclic aliphatic bridging group or an unsubstituted or substituted aromatic bridging group, m is 0 or 1, $Y_1$ is unsubstituted or substituted phenylene or unsubstituted or substituted naphthylene, $Z_1$ is —$SO_2CH=CH_2$, or —$SO_2CH_2CH_2L_1$ in which $L_1$ is a group capable of being split by the action of an alkali, $Q_1$ is halogeno, unsubstituted or substituted pyridinio, —$N(R_4)R_5$, —$OR_6$ or —$SR_7$ in which $R_4$, $R_5$, $R_6$ and $R_7$ are independently hydrogen or an unsubstituted or substituted alkyl, phenyl, naphthyl or benzyl group, and $Q_2$ is chloro or fluoro; or at least one member selected from the dioxazine compound group represented by the following formula (II) in the free acid form:

wherein $R_8$, $R_9$ and $R_{10}$ independently hydrogen or unsubstituted or substituted lower alkyl, $X_2$ is an unsubstituted or substituted and straight, branched or cyclic aliphatic bridging group or an unsubstituted or substituted aromatic bridging group, n is 0 or 1, $Y_2$ is unsubstituted or substituted phenylene or unsubstituted or substituted naphthylene, $Z_2$ and $Z_3$ are independently —$SO_2CH=CH_2$ or —$SO_2CH_2CH_2L_2$ in which $L_2$ is a group capable of being split by the action of an alkali, and $Q_3$ is halogeno, unsubstituted or substituted pyridinio, —$N(R_{11})R_{12}$, —$OR_{13}$ or —$SR_{14}$ in which $R_{11}$, $R_{12}$, $R_{13}$ and $R_{14}$ are independently hydrogen or an unsubstituted or substituted alkyl, phenyl, naphthyl or benzyl group; or a mixture of the dioxine compounds of the formula (I) and the dioxazine compounds of the formula (II); mixed with B) at least one member selected from the anthraquinone compound group represented by the following formula (III) in the free acid form:

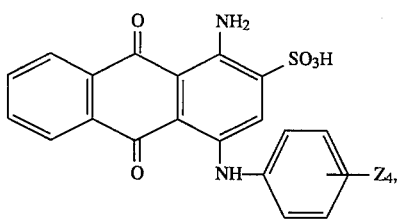
(III)

wherein $Z_4$ is —$SO_2CH$=$CH_2$ or —$SO_2CH_2CH_2L_3$ in which $L_3$ is a group capable of being split by the action of an alkali, wherein the amount in weight basis of B) is from 0.01 to 90 times that of A).

2. The composition according to claim 1, which comprises any of the dioxazine compound of the formula (I) or (II) as A).

3. The composition according to claim 1, which comprises a mixture of the dioxazine compounds of the formula (I) and the dioxazine compounds of the formula (II) as A).

4. The composition according to claim 3, wherein the amount in weight basis of one of the dioxazine compounds of the formula (I) and the dioxazine compounds of the formula (II) is up to 100 times that of the other dioxazine compounds.

5. The composition according to claim 3, wherein the amount in weight basis of the dioxazine compounds of the formula (II) is from 0.05 to 100 times that of the dioxazine compounds of the formula (I).

6. A method for dyeing or printing a cellulose fiber material or a fiber material containing cellulose fiber, which comprises applying thereto the composition of claim 1.

* * * * *

UNITED STATES PATENT AND TRADEMARK OFFICE
CERTIFICATE OF CORRECTION

PATENT NO. : 5,456,726
DATED : October 10, 1995
INVENTOR(S) : KAWABATA et al.

It is certified that error appears in the above-indentified patent and that said Letters Patent is hereby corrected as shown below:

ON THE TITLE PAGE:
In the Abstract, last formula;

change the formula to read

-- 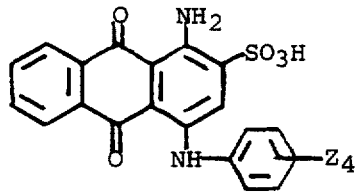 --.

Signed and Sealed this

Eleventh Day of June, 1996

Attest:

BRUCE LEHMAN

Attesting Officer      Commissioner of Patents and Trademarks